United States Patent [19]
Cejtin et al.

[11] Patent Number: 5,745,703
[45] Date of Patent: Apr. 28, 1998

[54] TRANSMISSION OF HIGHER-ORDER OBJECTS ACROSS A NETWORK OF HETEROGENEOUS MACHINES

[75] Inventors: Henry Cejtin; Suresh Jagannathan; Richard A. Kelsey, all of Princeton, N.J.

[73] Assignee: NEC Research Institute, Inc., Princeton, N.J.

[21] Appl. No.: 503,566

[22] Filed: Jul. 18, 1995

[51] Int. Cl.$^6$ ................................................ G06F 15/173
[52] U.S. Cl. ........................ 395/200.68; 395/200.32; 395/200.75; 395/200.43; 707/10; 707/201; 707/202
[58] Field of Search ........................ 395/610, 617, 395/618, 200.03, 200.13, 200.15, 200.68, 200.43, 200.75, 200.31; 707/10, 201, 202

[56] References Cited

U.S. PATENT DOCUMENTS

| | | |
|---|---|---|
| 4,031,512 | 6/1977 | Faber .................................. 340/147 R |
| 4,630,259 | 12/1986 | Larson et al. ............................ 370/60 |
| 4,750,109 | 6/1988 | Kita ........................................ 364/200 |
| 4,908,828 | 3/1990 | Tikalsky ................................. 371/69.1 |
| 5,060,150 | 10/1991 | Simor .................................... 364/200 |
| 5,095,480 | 3/1992 | Fenner .................................. 370/94.1 |
| 5,140,583 | 8/1992 | May et al. ................................ 370/60 |
| 5,224,100 | 6/1993 | Lee et al. .............................. 370/94.3 |
| 5,305,461 | 4/1994 | Feigenbaum et al. .................... 395/775 |
| 5,481,721 | 1/1996 | Serlet et al. ............................ 395/700 |
| 5,555,427 | 9/1996 | Aoe et al. ............................... 395/800 |

OTHER PUBLICATIONS

Cejtin et al., "Higher–Order Distributed Objects.", ACM Transactions on Programming Languages and Systems. vol. 17, No.5, US, pp. 704739, Sep. 1995.

Jagannathan et al., "A Customisable Substrate for Concurrent Languages" ACM Sigplan Notices, vol.27, No. 7, NY, US, pp. 55–67, Jul. 1992.

W.Clinger and J. Rees, editors, "Revised Report on the Algorithmic Language Scheme" ACM Lisp Points, 4,3,pp. 1–55, Jul. 1991.

T. Kamada et al. "Efficient Parallel Garbage Collection on Massively Parallel Computers" in Proc. of the 1994 IEEE Supercomputing Conf. pp. 79–88, 1994.

N. Venkatasubramanian et al., "Scaleable Distributed Garbage Collection for Systems of Active Objects" in Memory Management, pp. 134–147, Springer–Verlag, LNCS 637, 1992.

A. Birrell et al., "Distributed Garbage Collection for Network Objects," Tech. Rept. 116, Digital SRC Research Report, Dec. 1993, pp. 1–18.

Birrell et al., "Network Objects," Tech. Rept. 115, Digital SRC Research Report, Feb. 1994, pp. 1–62.

Hsieh, Wang and Weihl, "Computation Migration: Enhancing Locality for Distributed–Memory Parallel Systems," in Fourth ACM Sigplan Symposium of Principles and Practice of Parallel Programming, pp.239–249, 1993.

Kelsey and Rees, "A tractable Scheme Implementation," Lisp and Symbolic Computation, 7, 2, pp. 315–335, Jul. 1994.

*Primary Examiner*—Thomas G. Black
*Assistant Examiner*—Jean R. Homere
*Attorney, Agent, or Firm*—Philip J. Feig

[57] ABSTRACT

The system comprises a collection of address spaces within which potentially many concurrent lightweight perceptible threads may execute. The address space is uniformly distributed among different nodes in a network of heterogeneous machines. Address spaces are first-class and may be generated dynamically. Threads within an address space may communicate with one another via shared memory; communication between address spaces takes place using explicit message-passing.

16 Claims, 13 Drawing Sheets

```
(define-record-type thread
    ...
    continuation
    ...)

(define current-thread ...)

(define (schedule-thread thread)
    (set! current-thread thread)
    (let ((cont (thread-continuation current-thread)))
      (set-thread-continuation! current-thread #f)
      ((thread-continuation thread) #f))

(define (switch-to-thread thread)
   (call/cc (lambda (k)
            (set-thread-continuation! current-thread k)
            (schedule-thread thread))))

(define (context-switch thread)
    (add-to-queue! runnable-threads current-thread)
    (switch-to-thread thread))

(define (terminate-current-thread)
  (schedule-thread (another-thread)))

(define (terminate-thread thread)
   (remove-from-queue! runnable-threads thread))

(define (spawn thunk)
  (let ((thread (make-thread)))
     (set-thread-continuation! thread
                       (lambda (ignore)
                          (thunk)
                          (terminate-current-thread)))

(context-switch thread)))
```

FIGURE 1

```
(define (remote-run! aspace proc . args)
    (if (eq? aspace (current-aspace))
        (spawn (lambda ( ) (apply proc args)))
        (send-message message-type-run
                        (cons proc args)
                        (aspace-channel aspace)
                        (aspace-lock aspace))))

(define (send-message type message channel lock)
    (let ((message (encode type message)))
      (obtain-lock lock)
      (channel-write message channel)
      (release-lock lock)))
```

FIGURE 2

```
(define (remote-apply aspace proc . args)
    (let* ((condvar (make-condvar))
           (proxy (make-proxy condvar)))
      (remote-run! aspace
              (lambda ( )
                 (remote-run! (proxy-creator proxy)
                        (lambda (v)
                            (set-condvar! (proxy-value proxy) v))
                        (apply proc args))))

(condvar -ref condvar))
```

FIGURE 3

```
(define make-handle make-proxy)

(define (handle-value h)
  (let ((aspace (proxy-creator h)))
     (cond ((eq? (current-aspace) aspace)
             (proxy-value h))
           (else
             (remote-apply aspace-proxy value h)))))

(define (set-handle! h v)
  (let ((aspace (proxy-creator h)))
     (cond ((eq? (current-aspace) aspace)
             (set-proxy-value! h v))
           (else
             (remote-apply aspace set-proxy-value! h v)))))
```

FIGURE 4

```
(define (handle-test-and-set! h pred? v)
  (let ((local-test-and-set! (lambda ( )
                               (if (pred? (proxy-value h))
                                   (set-proxy-value! h v))))
        (aspace (proxy-creator h)))
    (cond ((eq? (current-aspace) aspace)
           (local-test-and-set!))
          (else
           (remote-apply aspace local-test-and-set!)))))
```

```
(define (dispatcher in-channel out-channel out-channel-lock)
  (let loop ()
    (let* ((size (get-message-size in-channel))
           (buffer (make-byte-vector size)))
      (read-message buffer in-channel)
      (disable-interrupts!)
      (let ((message (decode-message buffer)))
        (enable-interrupts!)
        (process-message message out-channel out-channel-lock)
        (loop)))))

(define (process-message message out-channel out-channel-lock)
  (case (message-type message)
    ((run)
     (spawn (lambda () (apply (message-proc message)
                              (message-args message)))))

((uid-request)
     (send-message message-type-uid-reply
                   (map make-uid-reply (uid-list message))
                   out-channel
                   out-channel-lock))

((uid-reply)
     (for-each process uid-reply (uid-reply-list message)
     (with-lock pending-message-lock
       (lambda ()
         (set! *outstanding-request-count*
               (- *outstanding-request-count* 1))
         (if (= 0 *outstanding-request-count*)
             (release-pending-messages!))))))
    ((pending)
     (if (handle-pending-message message out-channel out-channel-lock)
         (process-message message out-channel out-channel lock)))
    ((gc-request)
     (let ((proxies (get-local-proxies (message-aspace message))))
       (send-message message-type-gc-reply
                     proxies
                     out-channel
                     out-channel-lock)
       (reset-proxies! proxies)))
    ((gc-reply)
     (collect-local-proxies (message-proxy-list message)
                            (message-aspace message)))))
```

FIGURE 7

```
(define (fault-more-frames rest-cont-handle . args)
   ((handle-value rest-cont-handle) args)))

(define (run-cont-on-owner rest-cont-handle args)
   (remote-run! (proxy-creator rest-cont-handle)
      (lambda ( ) ((handle-value rest-cont-handle) args))))
```

FIGURE 9

```
(define (move-to! aspace)
   (call/cc (lambda (k)
             (remote-run! aspace k #f)
             (terminate-current-thread))))

(define (move-thread! thread aspace)
   (cond ((eq? thread current-thread)
          (move-to! aspace))
         (else
           (remote-run! aspace (thread-continuation cont) #f)
           (terminate-thread thread))))
```

FIGURE 10

```
(define (offload)
  (cond ((and (> (get-load (current-aspace)) *max-threshold*)
              (remote-apply master find-aspace (current-aspace)))
         => (lambda (target)
              (let ((thread (find-thread-to-migrate runnable-threads)))
                (remote-run!
                  master record-move (current-aspace) target thread)
                (move-thread! thread target))))))
```

FIGURE 11

```
(define (pick-a-country atlas)
  (let* ((point-transformer (make-transform (window-bounding-box)
                                            (atlas→bounding-box-atlas)))
         (t-atlas (transform-atlas point-transformer atlas))
         (mouse→countries (make-mouse→countries t-atlas))
         ...)
    (draw-atlas! t-atlas)
    (let loop ((selected-countries '( )))
      (let ((event (get-event)))
        (case (event→type event)
          ((motion)
           (let ((new-countries (mouse→countries
                                  (motion→position event))))
             (cond ((not (equal? selected-countries new-countries))
                    (for-each unhighlight! selected-countries)
                    (for-each highlight! new-countries)))
             (loop new-countries)))
          ((key-press)
           (cond ((eq? 'return (key-press→key-name event))
                  (destroy-window!)
                  (map country→name selected-countries))
                 (else (loop selected-countries))))
          (else
           (loop selected-countries)))))))
```

FIGURE 12

```
(define (pick-a-country atlas server-aspace)
  (let* ((point-transformer (make-transform (window-bounding-box)
                                            (atlas→bounding-box atlas)))
         (t-atlas (transform-atlas point-transformer atlas)))
    (remote-apply server-aspace
      (lambda ()
        (let ((mouse→countries (make-mouse→countries t-atlas))
              ...)
          ...)))))
```

FIGURE 13

```
(define (make-mouse →countries t-atlas)
  (let ((mouse→countries-table (make-handle
                                 (make-mouse→countries-table t-atlas)))
        (mirror-table (make-mouse→countries-table empty atlas)))
    (lambda (mouse-position)
      (let ((countries (lookup-mouse→countries
                         mirror-table
                         mouse-position)))
        (if (empty? countries)
            (let ((countries (remote-apply
                               (proxy-owner mouse→countries-table)
                               (lambda ()
                                 (lookup-mouse→countries
                                   (handle-value mouse→countries-table)
                                   mouse-position)))))
              (add-mouse→countries-table! mirror-table
                                          mouse-position
                                          countries)
              countries)
            countries)))))
```

FIGURE 14

```
(define (make-dna-workers worker-aspaces)
  (let ((db-proxies (map (lambda (aspace)
                           (remote-apply aspace make-proxy ( ))))
                         worker-aspaces))
    (values (make add! db-proxies)
            (make-find-nearest db-proxies))))
```

FIGURE 15

```
(define (make find nearest db proxies)
  (let ((nworkers (length db proxies)))
    (lambda (dna-goal)
      (let ((lock (make-lock))
            (left nworkers)
            (so-far infinitely-far-entry)
            (final-result (make-condvar)))
        (for-each
          (lambda (db-proxy)
            (spawn (lambda ( )
                     (let ((local-best (local-find-nearest
                                         dna-goal
                                         db-proxy)))
                       (with-lock lock
                         (lambda ( )
                           (set! so-far (closest-entry so-far local-best))
                           (set! left (- left 1))
                           (if (zero? left)
                               (condvar-set! final-result so-far))))))))
          db-proxies)
        (condvar-ref final-result)))))
```

FIGURE 16

```
(define (local-find-nearest dna-goal db-proxy)
  (remote-apply (proxy-creator db-proxy)
    (lambda ( )
      (let loop ((best-entry infinitely-far-entry)
                 (entries (proxy-value db-proxy)))
        (cond ((null? entries)
               best-entry)
              (else
                (loop (closest-entry best-entry
                                     (closeness dna-goal (car entries)))
                      (cdr entries))))))))
```

FIGURE 17

A
active: {p}
↓ p
B                    C
exports: { }         exports: { }
FIGURE 18A
A
active: {p}
B —p→        C
exports: {p}         exports: { }
FIGURE 18B
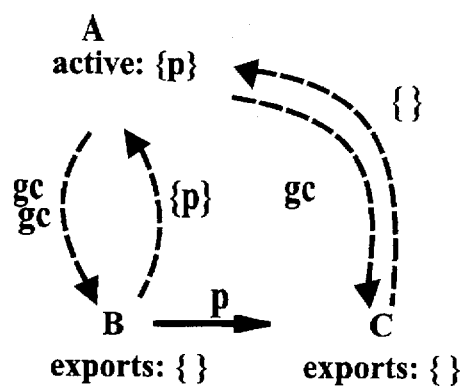
FIGURE 18C
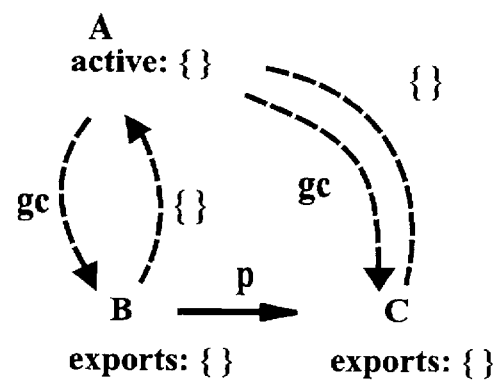
FIGURE 18D

TRANSMISSION OF HIGHER-ORDER OBJECTS ACROSS A NETWORK OF HETEROGENEOUS MACHINES

FIELD OF THE INVENTION

The present invention concerns the integration of distributed communications facilities for higher-order distributed objects such as closures and continuations using a uniform communication policy. Novel abstractions and paradigms for distributed computing, such as user-specified load-balancing and migration policies for threads, incrementally-linked distributed computations, and parameterized client-server applications, facilitate lightweight communication abstractions for higher-order objects and provide programmer control of communication cost.

BACKGROUND OF THE INVENTION

Process communication in a distributed environment requires solutions to a number of important, and potentially troublesome, issues. These issues concern the interaction of parallel and distributed tasks with local sequential computation, efficient migration of processes across nodes, effective storage management for long-lived distributed applications that create data on many different nodes, and the implementation of protocols for a loosely-coupled environment. The problems are old, and many solutions have been proposed. Almost all of these solutions, however, either entail defining a new programming language, or adding special primitives to an existing language to handle concurrency, distribution, and communication. In general, the latter proposals have used base languages that typically provide little support for defining or composing new abstractions. As a result, the semantics of new primitives to handle distributed programming cannot be easily expressed in terms of operations already provided by the language, or easily combined together to provide new functionality.

Obliq is a higher-order distributed language built on top of network objects. Obliq allows immutable objects to be freely transmitted, but implicitly generates network objects for any mutable structure. In contrast, the preferred implementation of the present invention makes no implicit assumptions on how objects are to be transmitted. Any Scheme object (including a thread or a continuation) can be explicitly copied or referenced. Scheme is a high-level language described by W. Clinger and J. Rees, editors, in an article entitled "Revised Report on the Algorithmic Language Scheme" in ACM Lisp Points, 4, 3, pp. 1-55, July 1991. Finally, Obliq does not support first-class continuations, and is implemented using a simple interpreter that generates Modula-3 code. In contrast, the present invention relies heavily on being able to send (partial) continuation objects across different machines, and the implementation is intended for compiled programs.

Java is a byte-coded system intended to work in heterogeneous distributed environments. Like the present invention, Java allows byte-codes to be transmitted across nodes, but the sequential core is based on C++. It does not support higher-order abstractions such as procedures, continuations, and first-class threads. The language also does not define any sharing abstractions.

CML is a concurrent dialect of ML that supports first-class events, channels, and preemptible threads. The present system shares some common features with CML insofar as both rely heavily on first-class continuations and procedures in their implementation. However, CML does not provide explicit support for distributed computation; thus, it does not include abstractions for building remote references or address spaces (machines). It also does not consider distributed garbage collection across disjoint address spaces. Facile is an extension of ML that is intended to operate in a distributed environment. The concurrency model used in Facile is a generalization of CCS. Consequently, distributed computing in Facile is based on synchronous communication using channels; the language does not have analogues to address spaces, proxies (remote references), system support for asynchronous message-passing, or the other primitives described here.

Piranha is an implementation of C.Linda that runs on networks of workstations. Unlike the present system, the lack of first-class continuation objects makes it problematic for Piranha to adapt gracefully to changing network loads. A Piranha process that retreats from a node must either discard all work it has so far performed on its current task, or require the programmer to manually construct the continuation object that is to be executed upon its resumption. Reification of a task state into a continuation is problematic in the C context; in contrast, because threads are implemented in terms of continuations, migrating a thread (i.e., retreating from a processor) is an easily specified operation in the present invention system. In addition, because Piranha is a tuple-space implementation, the fundamental communication abstraction (shared data expressed in terms of tuples) is conceptually distinct from the basic proxy abstraction defined here. Although one can presumably be implemented in terms of the other, proxies provide a more lightweight and flexible communication abstraction. Other parallel systems that operate over separate address spaces and which support message-based communication have similar differences.

Most concurrent and parallel dialects of higher-order languages such as Scheme or ML execute in a single address space. These systems do not provide primitives to allow threads explicitly to communicate across disjoint address spaces. Consequently, their semantics, implementation, and targeted applications differ in many important respects from the ones described below. Split-C is a parallel extension of C that provides a global address space. The design of Split-C shares some commonality with the present invention—allowing programmers a significant amount of control over communication costs. However, because it is an extension of C, the programming model and paradigms it supports differ in obvious ways from a distributed system based on first-class procedures, first-class continuations, and incremental distributed linking of code objects.

Process migration and computation migration are two approaches for moving threads in distributed environments. The present implementation shares much in common with computation migration insofar as continuations are migrated lazily. However, continuation migration protocols in our system are integrated within the Scheme 48 (the preferred language) exception handling facility—handlers on different nodes can choose to implement different functionality when control passes below the sent continuation base. For example, an error raised by a thread can be treated by either migrating the thread back to its original home, or faulting the error handler over to the thread's current address space.

Another aspect of the invention is its garbage collection strategy. Unlike reference counting garbage collection strategies, the present asynchronous collector requires only a single bit to reclaim proxies. The present approach bears greater similarity to distributed marking schemes that use bulldozing messages such as those described in an article by T. Kamada et al entitled "Efficient Parallel Garbage Collection on Massively Parallel Computers" in Proc. of the 1994

IEEE Supercomputing Conf. pp. 79–88, 1994 and an article by N. Venkatasubramanian et al entitled "Scalable Distributed Garbage Collection for Systems of Active Objects" in Memory Management, pp. 134–147, Springer-Verlag, LNCS 637, 1992, to confirm message arrival. Unlike these other schemes, the tick thread process used to provide the effect of bulldozing is itself asynchronous with respect to user processes, requires no extra acknowledgment signals, and is not centralized. The cyclic extension is synchronous, but its complexity is bounded only by the number of proxies, not by the number of administrative messages generated.

The garbage collection algorithm for Network Objects described in an article by A. Birrell et al entitled "Distributed Garbage Collection for Network Objects," Tech. Rept. 116, Digital SRC Research Report, December 1993, is somewhat similar to the present invention. Both systems permit proxies to be forwarded by address spaces other than the owner, and both systems are weakly synchronous insofar as local garbage collections in one address space can occur without requiring global synchronization. However, there are also several important differences. The Network Objects collector uses a reference counting scheme in which the owner of a shared object O maintains a list L of all processes that have a proxy or surrogate to O. Clients which no longer refer to a proxy notify the owner. The reference counting approach also effectively prohibits the collector from reclaiming cycles. In the present invention a simple export bit is used to reclaim proxies and no reference lists are maintained. The owner of a proxy is the only entity that can initiate the proxy's collection. More significantly, the network objects collector assumes a tight coupling between message sends and proxy (or surrogate) collection. To avoid race conditions of the kind outlined above, the Network Objects implementation uses acknowledgments to record network handles that are enroute from one address space to another. During transmission, such proxies are never collected by the sender. Because of the system's RPC (remote procedure call) semantics, acknowledgments can piggy-back on method return calls, although special acknowledgment signals are still necessary when a proxy is returned as a result of an RPC call. The present collector requires no acknowledgments from proxy receivers on remote-run! operations.

SUMMARY OF THE INVENTION

Scheme's support for first-class procedures and continuations make it an ideal platform in which to explore new paradigms and idioms for distributed computing. The ability to express new abstractions in terms of those already available in the language greatly simplifies the implementation. More importantly, it allows users to build non-trivial refinements and extensions without re-engineering the system from scratch. High-level data and control abstractions have much to offer in domains such as distributed computing, and that there are a number of important benefits in using procedures and continuations to express distributed applications that merit continued investigation. A primary goal of the present invention is to provide a small set of language abstractions for distributed computing that enable a variety of applications with different communication and computation requirements to execute efficiently using stock hardware and interconnect technologies. Keeping the distributed programming interface orthogonal to the sequential programming interface is an equally important objective of the invention. To realize this objective, a sequential base language must be chosen in which these abstractions can be easily expressed.

High-level languages such as Scheme as described by W. Clinger and J. Rees, editors, in an article entitled "Revised Report on the Algorithmic Language Scheme" in ACM Lisp Pointers, 4, 3, pp. 1–55, July 1991 and ML provide support for data abstraction via first-class procedures, and support for sophisticated control abstraction via first-class continuations. Because of their generality, procedures and continuations can be used to express operations for parallel and distributed programming. Using them as building blocks for high-level concurrent and distributed abstractions avoids the need to define an entirely new language, or to introduce ad hoc primitives to an existing one. In the present invention, a small set of such abstractions are developed using Scheme as the base language.

The distributed system comprising the present invention and described below supports concurrency and communication using first-class procedures and continuations. Since efficient load-balancing is an especially important problem on systems in which multiple users with different work-load requirements share resources with long-lived distributed applications, the described system transmits procedures and continuations efficiently.

Procedures and continuations are integrated into a message-based distributed framework that allows any Scheme object to be sent and received in a message. This integration engenders a number of new abstractions and paradigms for distributed computing, some of these are enumerated below:

User-level load-balancing and migration—Given the ability to transmit continuation objects, and given a representation of threads in terms of continuations, thread schedulers residing in different address spaces can migrate threads from one address space to another; these schedulers may be implemented entirely as user-level procedures in Scheme. Migration policies can be implemented without modification to application programs.

Incremental distributed linking—The system performs dynamic linking of code objects sent in messages. Distributed programs can thus be incrementally compiled and linked on a per-address-space basis; linking a new program does not entail a network-wide broadcast.

Parameterized client-server applications—The ability to communicate higher-order objects in messages permits servers and client applications to dynamically establish new protocols and functionality; this capability is especially important for wide-area distributed applications that would benefit from clients being able to off-load functionality to servers dynamically.

Long-lived parallel computations—Process state can be freely and transparently migrated, and processors (mostly asynchronously) garbage collect their state. These features make the system well-suited to expressing various kinds of long-lived parallel applications.

The system described below comprises a collection of address spaces within which potentially many concurrent lightweight preemptible threads may execute. The address spaces are uniformly distributed among different nodes in a network ensemble of (potentially) heterogeneous machines. Address spaces are first-class and may be generated dynamically. Threads within an address space may communicate with one another via shared memory; communication between address spaces takes place using explicit message-passing.

The lightweight distributed communication facility described in the present invention differs in important respects from RPC mechanisms found in many distributed languages. Since these languages are typically not higher-order, the issue of sending dynamically instantiated closures is usually not considered. Secondly, the marshaling code used in the present system permits any Scheme object (including references, continuations, top-level new definitions, etc.) to be sent in a message; there is no constraint on the kinds of objects that can be sent.

The notion of proxies is a generalization of the "network objects" described by Birrell et al in an article entitled "Network Objects" Tech. Rept. 115, Digital SRC Research Report, February 1994. Unlike network objects, the objects encapsulated within a proxy are not consistent across address spaces. However, since a proxy has a unique owner, it can be used to express the behavior of a shared data object. More importantly, the design and implementation of network objects is not geared with first-class procedures and continuations in mind; in contrast, many of the applications considered, and much of the implementation itself, liberally use higher-order structures.

Proxies are also not associated with a given set of methods; since Scheme is latently typed, there is also no type enforcement on proxies, nor are there any explicit stub modules to generate marshaling code for different Scheme types. Because of Scheme3 s latent typing discipline, type errors are detected at runtime. Thus, consider a remote-run! operation (described below) evaluated on address space A that spawns a thread T on address space B. The application of the closure associated with T may raise a runtime exception on B, even though it was defined on A. Type errors are a common example of such exceptions that could be flagged at compile-time. There has been much progress in building type systems and optimizers for Scheme that catch many potential type errors statically. Incorporating these facilities into the invention can significantly alleviate debugging overheads that would otherwise be incurred.

Many distributed systems allow complex data structures to be sent between nodes or address spaces, but few provide the same flexibility for procedures, dynamically-created code objects, or other complex pointer-based structures. In the context of a language such as Scheme, efficient implementation of such functionality is essential. The present invention provides precisely this expressivity.

Threads are represented in terms of continuations. Consequently, they can also be sent in a message; transmitting a thread in a message from address space A to B effectively migrates the thread from A to B. Ordinarily, continuations (and thus threads) may be closed over a large amount of state. To avoid the overhead that would occur if continuations were transmitted naively, a generalization of computation migration is supported to fault continuation frames lazily between address spaces. This feature significantly reduces the overall communication bandwidth requirements needed to support migration. Computation migration is described by Hsieh, Wang and Weihl in an article entitled "Computation Migration: Enhancing Locality for Distributed-Memory Parallel Systems" in Fourth ACM SIGPLAN Symposium on Principles and Practice of Parallel Programming, pp. 239–249, 1993.

The present implementation also allows templates to be sent in messages as well. (A template corresponds roughly to the code segment of a procedure. It contains a vector of Scheme 48 byte-codes, along with a vector of locations of top-level definitions. Scheme 48 is described by Kelsey and Rees in an article entitled "A tractable Scheme Implementation" in Lisp and Symbolic Computation, 7, 2, pp. 315–335, 1994. A template along with an environment defines a closure.) The ability to send templates enables distributed applications to be linked incrementally. An incremental copy mechanism is employed for templates, thus reducing the cost of migrating code objects.

Because complex data structures can be sent in messages and no restrictions are imposed as to where objects can be sent and copied, the implementation also includes a novel distributed (mostly asynchronous) garbage collector (GC) to collect objects referenced remotely; the collector also works over distributed cyclic structures. Local collections can run asynchronously and independently of GC's occurring in any other processor. Synchronization is only required to collect cyclic structures that span address spaces. Unlike other distributed garbage collection schemes, exporting local or forwarded references to other address spaces involves minimal GC-related bookkeeping; sending a remote reference requires simply setting a bit locally in the sender. The collection algorithm also introduces no overhead for forwarded references.

The communication primitives defined herein make no assumption regarding communication latency and because synchronous message-sends do not implement time-outs or timestamps, a message sent to a failed node will appear to the sender as simply a high-latency operation. Moreover, the described implementation does not replicate or log data on multiple nodes or stable storage. The implementation assumes a reliable network, and does not preserve timestamps or other logging information to validate message receipts.

Because Scheme is a type-safe language (i.e., operations can never be applied to obects of inappropriate type, and casts between objects of unrelated type can never be performed), the system already provides a measure of security that would not be available in distributed extensions of type-unsafe languages such as C. In addition, because Scheme is lexically-scoped, closure objects sent across nodes cannot corrupt any objects on the receiver other than those that are explicitly shared. However, the present system does assume trusted channels. Thus, receivers do not make any attempt to validate the integrity of incoming messages, and senders do not encrypt outgoing messages. It is of course possible to incorporate encryption and validation facilities on message sends and receives to provide an extra level of security, but such extensions are orthogonal to the main objectives of the present system.

The invention will be more clearly understood when the following description is read in conjunction with the accompanying drawing.

BRIEF DESCRIPTION OF THE DRAWING

FIG. 1 is an algorithm of a simplified implementation of threads in terms of operations on continuations;

FIG. 2 is a remote-run! algorithm;

FIG. 3 is an algorithm of synchronous send/reply communication using remote-run! algorithm;

FIG. 4 is an algorithm where a proxy can implement network handlers;

FIG. 7 is an algorithm for a dispatcher;

FIG. 9 shows algorithms for a handler encountering remote continuations;

FIG. 10 shows algorithms of the procedures used to move threads from their current address space to a new address space;

FIG. 11 is an algorithms of a thread scheduler using a centralized master address space to offload tasks;

FIG. 12 is an algorithm of a graphical atlas program illustrating an application of the invention;

FIG. 13 is an alternative algorithm of that in FIG. 12 where less data is transmitted;

FIG. 14 is an algorithm of a procedure to construct a mirror copy of a table on command;

FIG. 15 is an algorithm of a search routine used by a worker thread in a DNA sequence comparison application of the present invention;

FIG. 16 is an algorithm of the master task for a DNA database search program;

FIG. 17 is an algorithm which spawns folds over a local database to find the closest item;

FIGS. 18A–18D are graphical representations of a garbage collection of proxies.

DETAILED DESCRIPTION OF THE INVENTION

Figures 5, 6:
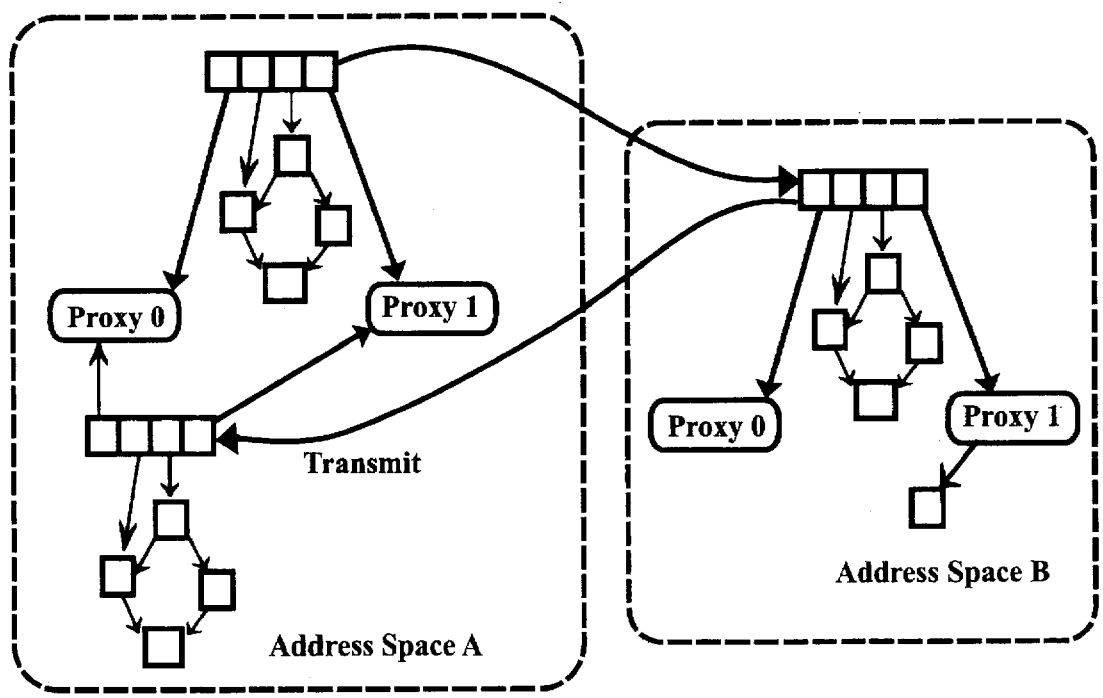
FIG. 5 is an algorithm of handle-test-and set! procedure.
FIG. 6 is a schematic representation of communication across address space.

The present invention is implemented as an extension to Scheme 48 described by Kelsey and Rees supra. Scheme is a lexically-scoped dialect of Lisp. Scheme 48 is based on as byte-coded interpreter written in a highly optimized, restricted dialect of Scheme called Pre-Scheme, which compiles to C. Because of the way it is implemented, the system is very portable and is reasonably efficient for an interpreted system. Unlike other Scheme implementations, Scheme 48 has a well-developed module system that forms an integral part of the language and system environment.

Scheme 48 supports concurrency using lightweight preemptible threads; threads synchronize using locks and condition variables. Scheduling, blocking, and resumption of threads is defined in terms of operations on continuations. In Scheme, a continuation is reified as a procedure that, when applied, performs the result of the remaining computation. To resume a blocked thread involves invoking the continuation representing the thread. Context-switching is similarly implemented in terms of capture and invocation of continuations. FIG. 1 shows the definition of various thread operations in terms of operations on continuations, omitting certain important details regarding interrupts, synchronization, and debugging.

In the implementation shown in FIG. 1, a thread is a simple record that holds a continuation. When a new thread is spawned, the continuation of the currently running thread is enqueued, and the thunk associated with the thread is evaluated (a thunk is a procedure of no arguments). If the currently running thread finishes its time-slice, relinquishes control, or blocks on I/O, its continuation is saved, and a new thread is scheduled. This scheduling operation restores the old continuation, reinitializes the continuation slot of the thread to be run, and applies the continuation. The reinitialization operation ensures that the garbage collector will not trace old continuations. Extending this formulation to handle timer interrupts complicates the design slightly. The system uses non-blocking I/O system calls to ensure that a thread blocked on I/O does not cause the thread scheduler itself to block.

The cost of context-switching threads is mitigated because the system uses a stack cache to make restoring and capturing continuations inexpensive. A stack cache stores only the most active portion of the stack; older frames are restored on demand from the heap.

The Scheme 48 thread system provides an expressive concurrency model, but all threads execute logically within a single address space. Consequently, while the thread implementation can be easily extended to support parallel applications in a shared memory environment, the thread system does not contain any message-passing or communication abstractions necessary for a distributed memory system. Address spaces and proxies are two extensions to Scheme 48 used to support distribution. These abstractions are described in detail below.

A distributed Scheme 48 program executes within a collection of address spaces, each of which can run on a different machine in a network ensemble or multiprocessor. More than one address space can reside on a node at a time. Thus, although there will usually only be as many address spaces as there are physical nodes, programmers can create more if they wish. Threads executing within an address space can communicate using shared memory, locks, and other abstractions provided by the thread system. Communication between address spaces takes place via message passing abstractions described below.

The manifest separation of intra-address space and inter-address space communication is intentional. An important goal of the invention is to provide programmers great flexibility to control and specify communication costs. Systems which implement logical shared memory on physically distributed platforms hide such costs; there is no visible source-level distinction between a local data access and a remote one. In the absence of explicit hardware support, or modifications to the underlying operating system, such approaches tend to be costly and inefficient for many kinds of programs. There are several important examples where the ability to have tasks communicate data explicitly even when executing within a shared-memory environment is useful.

On stock hardware and interconnects, systems that make communication explicit are likely to exhibit better performance than those that provide only a software-based shared memory abstraction. Historically, however, such message-passing systems have been difficult to write and debug because many complicated issues (e.g., data placement, locality, communication patterns, etc.) must be programmer-specified. In addition, the integration of distribution primitives into a language often entails modifications to the semantics of the sequential core, or imposes limitations on the kind of objects that can be communicated.

The described extensions alleviate much of the complexity found in other distributed programming languages and systems. These extensions are completely orthogonal to other Scheme primitives, and can be combined and abstracted in many different ways. There are no restrictions on the objects which can be sent in a message, or the contexts in which message-passing operations may occur. As result, many kinds of useful communication abstractions and paradigms can be defined easily.

Address spaces are implemented as ordinary Scheme data structures. To initialize the address spaces in a system, the current implementation associates with each address space a unique identifier and a list of pairs of channels; each element in the pair represents an input and output connection to another address space. Thus, every address space has a bidirectional connection to every other. This implementation assumes the existence of operating system services for network connectivity via sockets, ports, or similar abstractions.

There are two primitive operations that return address spaces as their result:

1. (current-aspace) returns the address space on which this operation is executed.
2. (make-aspace addr) creates a new Scheme 48 process and address space on a machine with Internet address addr, and notifies all other address spaces of the existence of this new address space. The address space created is returned as the result. Thus, address spaces can be dynamically created and linked to other address spaces in the system.

Because all address spaces have a direct connection to every other, the number of address spaces which can be generated is bounded by the number of input and output channels provided by the underlying operating system. This does limit the scalability of the implementation.

It is straightforward, however, to relax these constraints to allow arbitrary connected graphs to be built. For example, it is possible to permit an address space to be connected to only a subset of all other address spaces, and to dynamically create and destroy connections between address spaces. Such functionality complicates the garbage collection algorithm slightly, and requires routing decisions to be made either by the transport layer described below, or the underlying network, but in either case does not compromise the semantics of any of the language primitives introduced.

In addition to the usual Scheme objects (e.g., vectors, procedures, continuations, etc.), one can also send a proxy as part of a message. A proxy is a distinguished record type with two slots; the first contains a system-wide uid, and the second holds a value. Part of a proxy's uid is the address space on which the proxy was created. Because of the way it is represented, creating a new proxy does not involve global synchronization. The value slot of a proxy need not be consistent across different spaces. In other words, a proxy defines an address space relative abstraction.

Given a proxy P, the expression (proxy-creator P) returns the address space in which this proxy was created; (proxy-value P) returns the value of P in the address space in which this expression is evaluated; and (set-proxy-value! P v) sets the value of P to v in the address space in which this expression is evaluated.

A proxy may be thought of as a vector indexed by an address space uid. Each element in this conceptual vector corresponds to the proxy's value in that address space. The implementation of proxies refines this picture by distributing the vector; there is no inter-address space communication cost incurred to access a proxy's local value. This distinction is important because it provides programmers the ability to distinguish local and remote data. Thus, a data structure that can be safely replicated can be encapsulated within a proxy; accesses and mutations to elements of this structure do not require synchronization or communication.

Sending Objects

The present system uses explicit message-passing. Programmers thus have significant control over communication costs. Scheme objects can be sent in a message by copy or by uid:

1. Copy: Ordinary Scheme 48 structures such as lists, vectors, closures, etc. are copied between address spaces. Within a message, sharing is fully preserved. Sharing is not preserved between messages. For example, consider a complex structure S. If S is sent in a message to an address space A, a new, structurally identical copy of S is constructed in A; Scheme "eq-ness" within this copy is honored. If S is resent to A, another copy is generated; "eq-ness" is not preserved between the two copies.
2. Uid: Certain Scheme 48 objects are associated with a unique identifier. Procedure templates, proxies, and symbols are salient examples. These objects are always transmitted between address spaces via uid. The receiving address space, however, may not always have a copy of the object referenced. For example, sending a symbol that is created by (read) will cause a uid to be sent that is unknown by the receiver. In these cases, the receiver explicitly requests the unknown object to be sent. Subsequent transmission of the same uid will not require the object to be resent.

Communication between address spaces is done using the remote-run! procedure. The expression (remote-run! AS procedures·args)

spawns a new thread on address space AS which, when run, applies procedure to args; the operation is asynchronous and returns immediately. An algorithmic representation of remote-run! is shown in FIG. 2.

If the target address space of a remote-run! operation is the current address space, a new thread is simply spawned to execute the application. Otherwise, a message is constructed and sent across the channel connecting the source and target address spaces. The send-message procedure is responsible for writing a message to the target address space. Besides the actual message, send-message requires knowing the type of message being sent; in this case, the type is "run". It also needs to know the appropriate output channel, and requires access to a lock to prevent other messages from being sent to the target by threads concurrently executing on its address space while the transfer is underway. Send-message linearizes the message and associated data and releases the lock when complete.

It is possible to express an RPC-style version of remote-run! as shown in FIG. 3. Condition variables are synchronizing cells similar to I-structures. An attempt to read a condition variable that does not have a value causes the accessing thread to block. Threads blocked on a condition variable are awakened when the variable is set. The remote-apply procedure applies its proc argument to args on the target address space. The thunk sent to the target is closed over a proxy; thus, evaluating the thunk on the target requires sending the proxy as well. The value of this proxy on the source address space is a condition variable. The sending thread blocks on condvar until the receiver executes a remote-run! operation back on the sender's address space. This operation is executed only upon the completion of the application of proc to args. The target determines the source address space by evaluating, (proxy-creator proxy). Because the procedure executed by the target uses a condition variable encapsulated within a proxy to guarantee proper synchronization, this implementation is concise and efficient.

Since proxies have a unique owner, they can be easily used to implement shared global data structures such as network handles as shown in FIG. 4. A network handle is effectively a proxy. A reference to a local handle simply returns the value of the proxy; otherwise, a remote-apply is executed to apply the proxy-value procedure on the address space on which the handle was created. Similarly, setting the value of a handle either involves a local set-proxy-value! operation, or a remote-apply operation.

The use of first-class procedures significantly simplifies the specification of handles. In their absence, a remote reference would require pre-determined handlers to accept different requests. Generalizing the functionality of the network handle example would thus be problematic. For example, consider the definition of a handle-test-and-set! procedure that sets the value of a remote handle only if its current value satisfies a supplied predicate. Such a definition can be defined easily in terms of remote-apply as shown in FIG. 5. The pred? argument is a procedure that is applied to the handle's value on the handle's creator address space.

FIG. 6 illustrates the semantics of these abstractions. Communication across address spaces is shown. Address space A contains a Scheme structure with references to other Scheme structures and two proxies, Proxy 0 and Proxy 1. When this structure is transmitted to another address space B, copies are made of all its fields, with structure sharing fully preserved as shown. Of the two proxies copied, one has no local value (Proxy 0), while the other (Proxy 1) refers to another object local to address space B. When this same structure is resent back to address space A, the structure is again copied. Proxies retain their identity on transmission, but new copies are made of other Scheme objects.

Transport Layer

Typically, all Scheme 48 address spaces will start with the same Scheme 48 image. This image contains definitions of pre-defined base-level procedures and data structures. One of these processes may also be associated with a read-eval-print loop (REPL). Users can thus interactively input new expressions, load programs, etc. Values yielded by expressions input to the REPL are not automatically broadcast to all other address spaces, but instead are faulted across on demand.

Message encoding and decoding is performed by the Scheme 48 virtual machine. Encoding and decoding is done using fairly standard techniques by linearizing data structures, except for the treatment of closures, continuations, and other dynamically created objects.

Data structures in a message are encoded by building a vector that corresponds to a fiat (linear) representation of the structure. Cycles are detected by explicitly marking objects when they are first visited, and unmarking them after the current message has been fully scanned.

Templates and symbols are associated with unique identifiers. In general, these uids are globally known across all Scheme 48 images. Consequently, it will usually be the case that sending the uid of these objects is sufficient for them to have well defined meaning on the receiver.

Exceptions to this rule occur when procedures or symbols are generated dynamically. This can happen when users input new definitions to the REPL or load files. We discuss how such cases are handled below.

There is a set of coroutine pairs in each address space. Each element in the set is responsible for receiving and dispatching messages sent from a particular address space. The decoder routine receives a flattened representation of a message, interprets it to reconstruct a valid Scheme object, and sends the resulting Scheme object to a dispatcher that then executes the appropriate operation.

The decoder is implemented as part of the Scheme 48 virtual machine. After the object is decoded, it is dispatched based on its type. There are four basic types of messages:

1. User-space Messages. These messages correspond to remote-run! operations.
2. Request Messages. When a message is received containing uids that are not mapped to any Scheme 48 value in the receiving address space, a request message is sent asking for the value.
3. Reply Messages. Any user-space message that contains unresolved uids is placed on a pending queue. Reply messages send the values of unknown uids. Whenever a pending message becomes fully resolved, i.e., when the values associated with all uids in the message become known, the message becomes executable, and a new thread is spawned to evaluate it.
4. GC Messages. Periodically, messages are sent among address spaces to garbage collect objects with global identity, e.g.,proxies.

An algorithm of the basic structure of a dispatcher is shown in FIG. 7. The essence of the dispatcher is the process-message procedure. Incoming messages are handled by dispatching a message to one of six basic message types. The procedure takes a message and an output channel, and interprets the message:

1. Run messages are used to implement remote-run! operations. The receiver applies the procedure to the provided arguments in a separate thread of control.
2. Uid-request messages are requests for the value of an object referenced by a uid. When a message containing a uid is sent, no attempt is made by the sender to verify that the receiver actually has the object referenced by the uid. When the decoder on the receiver encounters a messages with uids that have no value in its address space, it notifies the dispatcher to initiate a uid-request message.
3. Uid-reply messages are received in response to a uid-request message. Upon receipt of a uid-reply, the receiver reconstructs the object on its address space, updating relevant uid tables. In addition, the count of outstanding uid requests is also decremented. When this count becomes zero, all outstanding requests have been serviced, and messages which were previously placed on a pending queue (because they referenced uids not known on this address space) can now be executed.
4. Pending messages are initiated only by the decoder, and are never sent between address spaces. A pending message is generated whenever the decoder encounters a message that references uids whose values are not known. In this case, the corresponding message must be placed on a queue until its missing components are faulted over.

The other message types are gc-request and gc-reply.

It is often the case that administrative messages (e.g., uid-reply) will themselves contain incomplete data. These messages will be flagged by the decoder as pending, but must still be handled by the dispatcher. For example, a uid-reply message that sends location or template uids not known by the receiver must still be processed (i.e., outstanding requests must be decremented) even though the message proper cannot be evaluated.

Figure 8A:
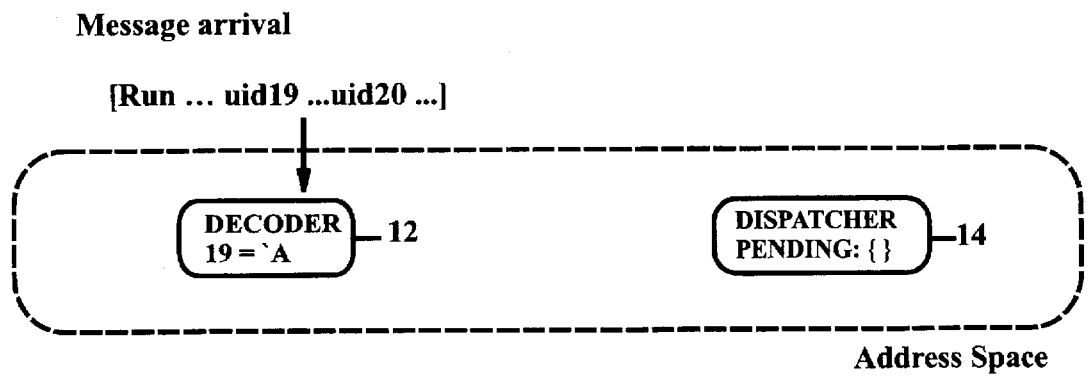
FIGS. 8A, 8B and 8C are schematic representations of a decoder and dispatcher with a run message containing unknown uids.
Figure 8B:
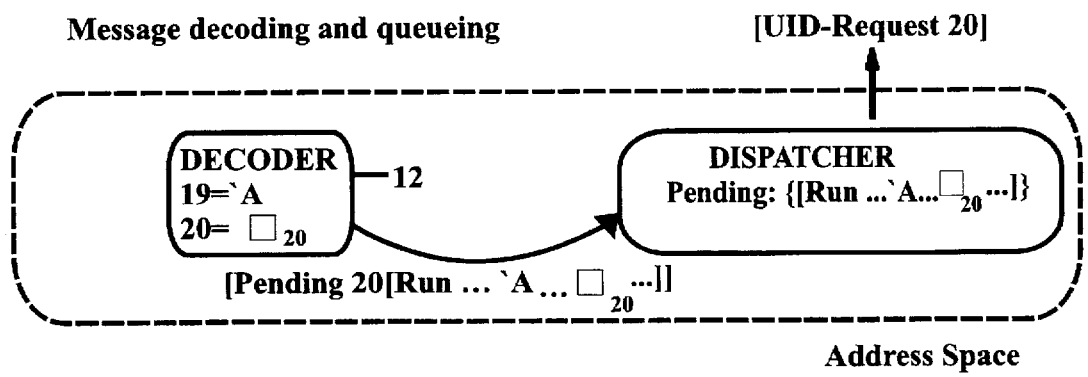
Figure 8C:
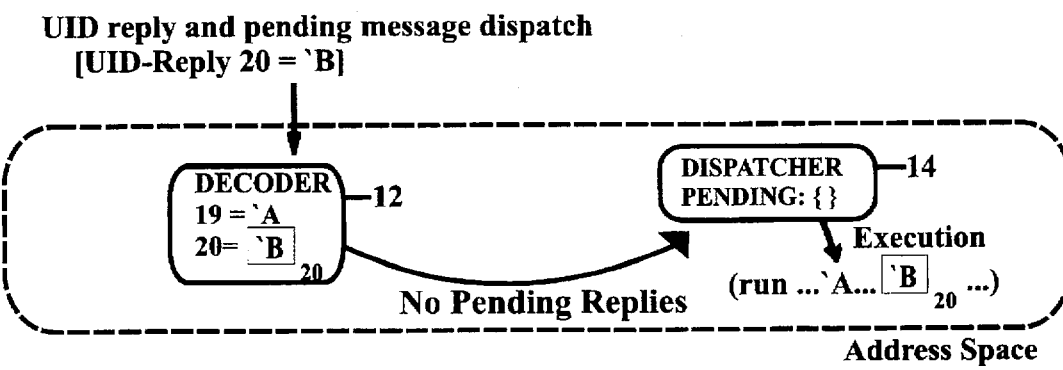

FIGS. 8A, 8B and 8C illustrate the relationship between the decoder and dispatcher. A run message containing unknown uids received by an address space 10 causes the uid to be recorded by decoder 12. As shown in FIG. 8B, the message is stored on a pending queue in dispatcher 14. A request for the object associated with the uid is made to the sender from dispatcher 14. When the reply is received by decoder 12 (FIG. 8C), the message is removed from the pending queue in dispatcher 14 and is scheduled for execution.

Scheme 48 threads are first-class objects represented as continuations. In order to support long-lived distributed computations, it is important to allow threads to migrate efficiently between different address spaces based on load-balancing and locality criteria. Continuations, i.e. threads, may refer to a large amount of state. Thus, migrating a thread by simply copying its entire continuation from one address space to another is likely to be too expensive to be practical. To alleviate the overheads in transmitting continuations, a form of computation migration is described by Hsieh, Wang and Weihl supra.

Sending a continuation of a thread involves sending only its top few frames, together with a handle stored at the base of the sent continuation. The value slot of this handle contains a reference to the rest of the continuation stack. On the receiving end, a thread is spawned that resumes the continuation. During the course of its computation, such a thread might never return to its continuation's base frame; this is particularly likely to be the case if threads are long-lived, or subject to frequent migration. In the latter case, avoiding the copy of the entire continuation stack can significantly reduce network traffic. Of course, if the top frames of the continuation refer to a large amount of data, a significant amount of copying may take place when the continuation is first migrated. Since this data is at the top of the stack, it is highly likely that it will be referenced by the continuation when it is resumed by the receiver. This is less likely to be the case for data stored at deeper frames in the continuation stack.

When control does pass through the base of a remote continuation object, an exception is raised. The executing handler has several options. For example, it may choose to execute a remote-run! operation in the address space on which the proxy found at the base was created. This operation might fault several more frames of the continuation back to the receiver. When these frames are received, the handler fixes up the existing continuation and resumes the thread. Alternatively, the handler may choose to apply the value of the proxy on the proxy's owner. In this case, the thread migrates back to its original home. FIG. 9 illustrates algorithm implementing these two alternatives. Among other options, a handler which encounters a remote continuation can choose to have more of the continuation's frames faulted over to its address space, or it can choose to have the rest of the continuation executed on the address space in which the continuation was originally created. Fault-more-frames implements the first alternative, and run-cont-on-owner implements the second alternative.

Representing threads in terms of first-class procedures and continuations enables a number of interesting and novel paradigms. One of the most important advantages of such abstractions is the ability to migrate threads between address spaces using the same techniques used to migrate procedures. A thread scheduler capable of migrating threads between address spaces can be expressed entirely in user code. Moving a thread from one address space to another only involves using operations on continuations. FIG. 10 defines two procedures to move threads from their current address space to a new address space. Both move-to! and move-thread! manipulate continuations. The algorithm move-to! runs the continuation of the current thread on the target address space. The algorithm move-thread! runs the continuation of its input thread on the target address space. Both procedures terminate the thread on the source address space by either scheduling another thread to run (in the case of move-to! or removing the thread from the runnable thread queue (in the case of move-thread!).

When called with a target aspace, move-to! does the following:

1. It captures the continuation of the currently executing thread.
2. It does a remote-run! of this continuation in the target address space. The remote-run! operation will create a new thread to run this continuation.
3. It terminates the thread on the source address space.

Move-thread! is similar to move-to!, except it runs the continuation of its input thread on the target address space.

Variations to this basic strategy provide greater control and flexibility over how and where threads migrate. All of these variations, however, build on the basic flexibility afforded by first-class continuations and procedures. For example, FIG. 11 shows the basic structure of a thread scheduler that uses a centralized master address space to offload tasks. The offload procedure coordinates with a central master address space to determine a target address space. The master records loads on different address spaces. The off load procedure queries the master address space to find a lightly-loaded address space if the load on its address space exceeds some threshold. The record-move procedure records the migration; load information is adjusted appropriately.

In most distributed systems, monitoring the behavior of procedures such as offload or find-aspace is problematic since little if any support is provided for such interaction. Programmers must usually hard wire monitoring facilities into these procedures. The present invention affords users much greater flexibility to monitor and debug ongoing computations. For example, a user can send messages to any address spaces from a read-eval-print loop executing on any node in a configuration. In this particular case, a user can type the following expression at a REPL (read-eval-print loop) to find the load average on an address space AS:

> (remote-apply master (lambda (as) (get-load as)) AS)
;;; the ">" represents a REPL prompt.

The template associated with the procedure defined by the expression, (lambda (as) (get-load as)), is constructed on the address space of the sender and dynamically shipped to the master. There is no constraint requiring the evaluation of the above expression to occur on the same node in which the address space containing the master resides.

The ability to download code dynamically can be used to reduce communication overhead by tailoring the communication protocol to the task at hand. Client-server applications are a good example where dynamic modification of an initial communication protocol is especially important. In most systems, client/server protocols are fixed. This design decision is expensive if clients and servers are not tightly coupled, if response times on client or server machines are not negligible, or if message latency is high.

As an example, consider a graphics application that displays a map of the world. The input to the program is an atlas represented as a list of countries. Each country has a name (a string), and a list of closed curves that define the country's boundaries. The interior of a country is defined as the curve itself plus all those points for which the curve has an odd winding number. The purpose of the application is to:

1. Open a window.
2. Display the boundaries of all countries.
3. Track the mouse. If the mouse is in a country, the country is colored and its name is displayed.
4. Monitor keystrokes. When the return key is struck, return the name of the country on which the mouse is placed (if any), and exit.

Client-server applications involving the present invention are most useful when they are run on a client machine different from the server machine controlling the display. On tightly-coupled networks, the latency cost in waiting for every mouse event to be sent to the client for translation may not be severe enough to warrant special attention. However, if the client and server are on a wide-area network, or if network bandwidth and latency are not sufficient, communication demands placed by this application will be severe enough to justify a more sophisticated work partition between the server and the client.

Disregarding remote communication, a simple outline of the above application is shown in FIG. 12. The make-transform procedure returns a procedure that implements a transformation which sends the second box to the first. Thus t-atlas is the input atlas with input coordinates transformed to screen coordinates. The procedure make-mouse→countries returns a procedure mouse→countries closed over a large table that associates a screen point with the list of countries in the atlas which overlap that point. Given a mouse position, mouse→countries returns the list of countries that the mouse lies within.

In the code shown, every mouse event involves communication between the server controlling the display, and the application containing the atlas and the mouse→countries procedure. If the server runs on aspace, evaluating (remote-apply aspace pick-a-country atlas)

will cause the application to run on the same machine as the server, returning the countries on which mouse resides when the user hits the return key back to the client machine. Alternatively, by rewriting the procedure slightly we can transmit less data (see FIG. 13). Functionality from the client to the server can be offloaded by using address spaces and remote application. In this alternative procedure, the client computes the coordinates of countries in the atlas to conform to screen coordinates, but the association between cursor positions and countries in the atlas is computed by the server. Downloading code in this way simplifies the protocol and allows the dynamic partitioning of work between machines.

By making implementation of make-mouse→countries aware of address spaces, it is possible to reduce communication costs still further. If the procedure returned by make-mouse→countries wrapped a handle around the table it builds, the server can incrementally construct a mirror copy of this table on demand. The code to effect this incremental faulting of the mouse/country table from the client to the server is outlined in FIG. 14. By making make-mouse→countries build a table on the client, and incrementally build a mirrored table on the server, it is possible to reduce communication costs by avoiding sending table entries unless they are explicitly requested. It is assumed that a table representation provides efficient access to sparse data.

As a final example, consider the implementation of a DNA sequence comparison algorithm. The algorithm takes as input a target string and a database, and initiates a parallel search for the string in the database, returning as its result the element in the database that bears the greatest similarity to the target. A natural implementation strategy is to use a master-worker arrangement. The master creates a number of worker threads with each worker responsible for comparing the target to a specific portion of the database. When a thread finds its local best match, it notifies the master and terminates. The master completes when all threads complete, returning the global best string found. This kind of application is well-suited for implementation in the present invention, and benefits from the liberal use of higher-order procedures.

Associated with each worker is a proxy owned by the address space where the worker will live. This proxy will contain the portion of the database that is to be examined by this worker. In addition, a procedure is required to add new elements to a worker's portion of the database. This procedure along with the search routine used by a worker is provided by the procedure shown in FIG. 15. Db-proxies is a list of proxies. The value of the $i^{th}$ element contains the portion of the database seen by the $i^{th}$ worker.

The make-add! procedure simply keeps track of the total length of all the entries in each worker's portion of the data base. When given a new item to add, it finds the worker with the smallest local data base and adds the entry to that worker's proxy. Given the proxy, the database, and the value to add to that database, the addition is accomplished by evaluating the following expression:

(remote-apply (proxy-creator proxy)
 (lambda ()
  (set-proxy-value!
   proxy
   (cons dna (proxy-value proxy))))))

Remote-apply (versus remote-run!) is used here simply for the synchronization it provides. Note that dna is implicitly copied to the worker address space because it occurs free in the procedure evaluated by remote-apply.

Make-find-nearest returns a procedure which, when called on a string, returns the distance of the closest item in the database to this string. To do this, it spawns one thread per worker. Each thread will find the closest entry in that worker's database (by calling local-find-nearest) and will then update a location which has the closest item found so far. If it is the last worker to finish, it writes the result in a condition variable which is then read by the top-level thread. This is the essence of the master task, and is shown in FIG. 16.

Local-find-nearest, given the DNA string being searched for and the proxy holding a workers local database, simply executes a remote-apply operation targeted for that worker's address space. The procedure spawned folds over the local database to find the closest item. Its definition is shown in FIG. 17. Worker threads execute local-find-nearest to find the closest match on their portion of the database.

Garbage Collection

Local garbage collection can proceed asynchronously in each address space, so long as proxies and their local values are preserved. Proxies cannot be collected locally since any proxy that has been sent to or received from another address space is potentially accessible from other address spaces via remote-run! operations. The following is a description of two non-local garbage collection algorithms for proxies, an asynchronous algorithm that cannot collect cycles and a synchronous algorithm that can collect cycles.

The asynchronous garbage collection algorithm used in this system is designed with the following assumptions:

1. Remote references are likely to be ephemeral. Thus, creating and destroying them should be inexpensive and entail minimal bookkeeping overhead.
2. Message communication is costly relative to computation. Thus, garbage collection should minimize the use of synchronization messages even if this leads to a less aggressive collection strategy.
3. Messages are delivered in FIFO order between any two processors, but there is no bound on communication latency. There is no assumed arrival order of messages sent to different address space by the same sender.

The first assumption is a consequence of the functional programming style encouraged by Scheme. Because mutation is rare, most objects tend to be short-lived. Objects tend to be allocated and deallocated much more frequently than they tend to be mutated. Procedures also tend to be small and lightweight. Consequently, most references tend to have small lifetimes. The latter two assumptions derive from constraints imposed by commercially available (low-end) network technology and protocols that have been used in testing a prototype of the present invention. These assumptions are not necessary in all implementations of the invention.

The garbage collection algorithm requires a one-bit export flag in each proxy. This flag is set by the sender whenever a proxy is included in an outgoing message and cleared by the collection algorithm. Local proxies whose export bit is clear may be collected by an address space at any time.

A simple procedure that may be used by an address space, A, to garbage-collect proxies that it has created is as follows:

1. A notifies all address spaces that it is now garbage collecting (GC) its proxies.
2. When address space B receives A's GC notification, it sends to A a list of all of A's proxies currently extant on B and clears the export bits on those proxies.
3. B can now reclaim any of A's proxies that do not have local values. Those that have local values can be collected only when A notifies B that it is safe to do so.

A can reclaim any proxies that have no local references and were not on any of the lists of proxies returned by other address spaces. A also notifies B of all proxies it can reclaim. Any proxy which B could not originally collect because they had local values can now be collected if they are included in the list returned by A.

This algorithm is simple and asynchronous. It has two fundamental flaws, however. The first is that it cannot collect cycles of proxies. This is remedied by defining a synchronous variant of this collector. The more serious problem is that the algorithm can potentially reclaim proxies that are still referenced. Repairing this lack of safety requires making the algorithm weakly synchronous.

The following sequence of events illustrates the problem with the algorithm. FIGS. 18A–18D depict these actions graphically. Because no constraints are imposed on communication latency, a simply asynchronous garbage collection strategy may erroneously collect live data associated with an accessible proxy.

1. A creates proxy p and sends it to B (FIG. 18A).
2. B sends proxy p to C, setting p's export bit on B (FIG. 18B).
3. A starts its garbage collection procedure, sending messages to B and C (FIG. 18C).
4. B reports to A that it has proxy p, clears its export bit, and reclaims its local copy. C reports that it has none of A's proxies (proxy p is still in transit from B).
5. A finishes its collection and does not reclaim p, because B reported having a reference to proxy p.
6. A performs a second garbage collection. This time neither B nor C report having proxy p, so A reclaims it (FIG. 18D).
7. The message containing proxy p finally arrives at C, which now has a reference to a proxy whose value no longer exists.

It should be noted that message transmission is not atomic and there is no global time-ordering on message events. Thus, while A and B may have consistent images of shared data, consistency does not extend to include shared objects held by C, or that are in transit from B to C. To remedy these problems, a global "tick" thread is defined which creates a coarse-grain time ordering on message transmission. The behavior of the tick thread guarantees that all messages in transit at the time the tick thread last visited an address space will have been received when the tick thread next arrives. Some linear ordering is assumed on address spaces. When running on address space A, the tick thread sends a message (via remote-apply) to every address space greater than A in this ordering. This message simply executes the null procedure. When all messages have been acknowledged from all address spaces, the tick thread moves from A to the next address space in the ordering. When all address spaces have been visited, it is guaranteed that any messages in transit before the last iteration of the tick thread has reached its destination. By waiting for two tick threads between garbage collections, it is possible to ensure that every proxy that is enroute during one garbage collection will have arrived at its destination in time for the next collection.

This algorithm is simple because it is highly local, and relies only on an assumption that messages are delivered in FIFO order on each channel. A more aggressive collection strategy that reclaims dead remote references more eagerly is possible, but such procedures are unlikely to be as simple and unobtrusive as this one.

Because the tick thread effectively implements a depth-first walk over a graph of address spaces, the correctness of the algorithm does not fundamentally rely on a completely connected topology, although such a topology simplifies the description. An implementation of the present invention that does not assume full connectivity of address spaces can still use the garbage collection strategy described, but some care must be taken in determining when connections between address spaces are created and destroyed. For example, it would be incorrect to create a channel C between address space A and B if the tick thread is currently traversing descendants of A. Proxies sent from A to B along C may not be properly recorded since the tick thread will not traverse the new channel in the current iteration.

The asynchronous collector is unable to collect cycles of proxies. If proxy p, owned by address space A, has as its value proxy q, owned by B, which in turn has p as its value, A will always prevent B from reclaiming q and vice versa. To prevent dangling references, the proxies in a cycle need to be reclaimed simultaneously.

The algorithm used for handling cycles is as follows:

1. All address spaces stop computing.
2. Each address space uses its local garbage collector to determine which proxies have local references and determines, for each proxy, the set of proxies reachable from that proxy's value. These sets form the proxies into a graph, with an edge indicating that one proxy's value contains another.
3. The address spaces cooperatively walk the graph of reachable proxies, starting from the locally referenced ones, marking each reachable proxy.
4. All unmarked proxies are reclaimed.

In the worst case, this algorithm requires time linear in the number of proxies. In practice it is expected that most applications will not create cycles in the proxy graph and that, for those that do, the vast majority of proxies will still be reclaimed by the asynchronous algorithm.

System

Figure 19:
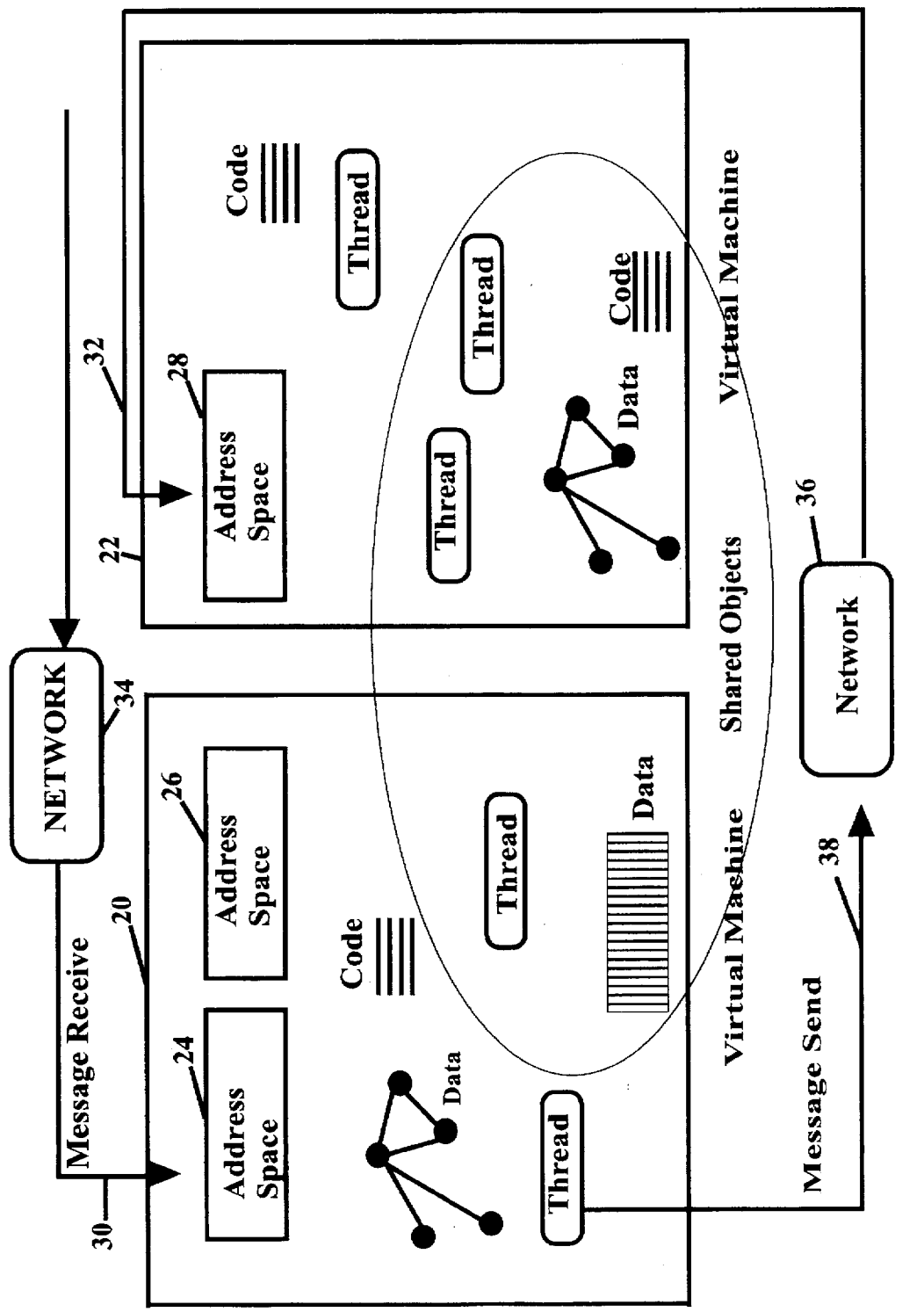
FIG. 19 is a schematic representation of the invention.

FIG. 19 is a schematic representation of the invention. Virtual machines 20, 22, comprising address space 24, 26 (in virtual machine 20) and address space 28 (in virtual machine 22), receive incoming messages 30 and 32 from network 34 and 36. The networks may also be the same network or different portions of a network. A shown network 34 receives messages sent from another virtual machine, not shown, while network 36 receives a message 38 sent from virtual machine 20. Each virtual machine contains data, code and thread objects. Any of these objects, i.e. data, code or thread objects, may be shared between virtual machines as shown schematically by the shaded oval in FIG. 19. Any of these objects may be communicated between virtual machines via explicit message-passing protocols.

Performance

Because the sequential core of the present system compiles to byte codes, the overall performance of the system will obviously be poorer than a native code implementation. To validate the utility of the described language abstractions, the byte-code implementation appears to be a reasonable compromise between a very inefficient, but simple, source-level interpreter and an efficient, but less portable, native-code compiler.

Since the message decoder is implemented in a virtual machine, the baseline times for message transmission are nonetheless very good despite the fact that all operations require byte-code interpretation. Table 1 gives baseline times for the system. The first column gives measurements taken on two MIPS R4000 50MHz processors connected via a 10 Mb/s Ethernet. The second column provides times for the benchmarks on 33 MHz R3000 machines also connected via a 10 Mb/s Ethernet. Note that the cost of sending a TCP/IP packet in C from user to user space takes roughly 1.9 milli-seconds on the present network. This number was determined by dividing by two the time required to send a packet and then receive a reply.

TABLE 1

|  | R4000 | R3000 |
| --- | --- | --- |
| Times to execute in milli-seconds | | |
| Remote-run! | 2.3 | 3.9 |
| Remote-apply | 4.6 | 8.1 |
| Time to send in μ-seconds | | |
| Proxy | 30.5 | 57.5 |
| Integer arg | 27.1 | 44.1 |
| Vector | 105 | 131 |
| Procedure | 41.5 | 172 |
| Thread | 170 | 576 |

As another baseline comparison, in Scheme 48, it takes 4.09 μ-seconds to execute the null procedure on an R4000, and 8.02 μ-seconds to execute it on an R3000. It takes 378μ-seconds on an R4000 to spawn a thread that calls the null procedure, to schedule it, apply its thunk, and then return. It takes 1060μ-seconds on an R3000 to do the same operation.

The first two rows measure the cost of a remote-run! and remote-apply operation of a null procedure. The remote-apply operation measures round-trip time. Using the R4000 times for a remote-run!, it is seen that, after subtracting the overhead of TCP/IP (1.9 milli-seconds), 400 μ-seconds are spent in Scheme 48. Of this time, 378 μ-seconds are involved with thread creation, context-switching, and synchronization, indicating that only roughly 12 μ-seconds are spent in the transport layer for decoding and dispatching. As expected, the overheads for executing a remote-run! are dominated foremost by TCP/IP costs, and secondly by thread management overheads. The transport layer contributes only a small overhead compared to these other costs.

The next four rows measure the cost of sending a proxy, an integer argument, a vector of 10 elements, a procedure with an empty environment, and a minimal thread. Each of these rows measure overheads above a simple remote-run! operation. The remote-apply time is approximately twice that of remote-run!. The cost of sending a proxy is roughly the same as sending a simple integer argument. The extra overhead is due to administrative costs to record the receipt of the proxy in appropriate tables. The extra cost of sending a thread over that of a procedure is due in large part to the need to migrate the thread's dynamic environment, i.e., the top few frames of its continuation.

Having described and illustrated the sending of higher-order distributed objects, it will be apparent to those skilled in the art that variations and modifications are possible without deviating from the broad spirit and principles of the present invention which shall be limited solely by the scope of the claims appended hereto.

What is claimed is:

1. An apparatus for sending messages across machines comprising:

a plurality of data objects, code objects, threads and globally unique identifiers in at least one virtual machine in a network of machines; and a plurality of address spaces in said at least one virtual machine, each address space having a unique identifier and a list of pairs of input and output channels, said address spaces being capable of creating and destroying said channels;

whereby a thread sends data objects, code objects, thread objects or global unique identifiers in the form of a message to a selected address space, said selected address space intercepts and reconstructs incoming messages.

2. An apparatus as set forth in claim 1, where said address space reconstructs messages dynamically so that a new message can be intercepted by said address space without said address space stopping intercepting incoming messages.

3. An apparatus as set forth in claim 1, where a plurality of threads in the same virtual machine simultaneously sends messages to a plurality of selected address spaces.

4. An apparatus as set forth in claim 1, further comprising a shared memory comprising unique identifiers, where each unique identifier is associated with a data object, code object or thread.

5. An apparatus as set forth in claim 1, where additional address space is added dynamically to a running computation without causing ongoing computations to halt.

6. An apparatus as set forth in claim 1, where said at least one virtual machine resides in a heterogeneous network of machines.

7. An apparatus as set forth in claim 6, where said network comprises a local area network.

8. An apparatus as set forth in claim 6, where said network comprises a wide area network.

9. An apparatus as set forth in claim 6, where said network resides in a single machine.

10. A method of sending messages across virtual machines comprising the steps of:

providing a plurality of data objects, code objects, threads and globally unique identifiers in at least one virtual machine;

providing a plurality of address spaces in said at least one virtual machine, each address space having a unique identifier and a list of pairs of input and output channels, said address space being capable of creating and destroying said channels; and sending via a thread, data objects, code objects, thread objects or global unique identifiers in the form of a message to a selected address space, said selected address space intercepting and reconstructing incoming messages.

11. A method as set forth in claim 10, where said reconstructing is performed dynamically so that a new message can be intercepted without said selected address space stopping intercepting incoming messages.

12. A method as set forth in claim 10, where said sending via a thread sends messages simultaneously to a plurality of selected address spaces.

13. A method as set forth in claim 10, further comprising providing a shared memory comprising unique identifiers, where each unique identifier is associated with a data object, code object or thread.

14. A method as set forth in claim 10, further comprising dynamically adding address space to a running computation without causing ongoing computations to halt.

15. A method as set forth in claim 10, where said providing at least one virtual machine is in a heterogeneous network of machines.

16. A method as set forth in claim 10, further comprising garbage collecting performed weakly synchronously across a plurality of virtual machines.

* * * * *